April 17, 1973 J. W. GIFFEN 3,728,098
MOLD ASSEMBLY
Filed May 14, 1971

INVENTOR.
James W. Giffen
BY Charles W. Gregg
AGENT

United States Patent Office 3,728,098
Patented Apr. 17, 1973

3,728,098
MOLD ASSEMBLY
James W. Giffen, Corning, N.Y., assignor to Corning Glass Works, Corning, N.Y.
Filed May 14, 1971, Ser. No. 143,474
Int. Cl. C03b 9/00
U.S. Cl. 65—361    4 Claims

ABSTRACT OF THE DISCLOSURE

A mold assembly for vacuum forming articles of molten thermoplastic material such as a glass making material. A mold member is separably supported in a cavity of a mold support member with the facing surfaces of the walls of such members in intimate contact with each other. The forming surface of the mold member which is contacted by the thermoplastic material during the forming thereof comprises a foraminous or perforated ceramic coating of a thermal barrier material, the foramina of the coating extending therethrough and connecting said forming surface with vacuum passages extending through the mold member to the exterior thereof for connection with a source of vacuum for the vacuum forming purposes.

BACKGROUND OF THE INVENTION

There is shown, for example, in U. S. Pat. 3,231,356, issued Jan. 25, 1966 to James W. Giffen, an apparatus or machine which is used for vacuum forming articles of a molten thermoplastic material such as from a ribbon or sheet of a molten glass making material such as 100 shown in FIG. 1 of such patent. Such machine or apparatus employs a series or plurality of molds such as 30 each embodying an article forming cavity such as 37 and web retaining cavities such as 38 which are connected through passages such as 36 to assemblies such as 45 which at times create suction in such cavities to form an article in each such cavity from said sheet or ribbon of molten glass such as 100. In relatively recent months a modified form of said machine or apparatus has been developed for vacuum forming substantially thin and high strength glass articles such as cups, saucers, dishes etc. from or of a ribbon or continuous sheet of stratified glass material formed by an apparatus and method such as disclosed in United States copending patent 3,582,306, granted June 1, 1971 of James W. Giffen, filed Nov. 4, 1968 and assigned to the same assignee as the present application. In such vacuum forming of said articles, a method and apparatus similar to those disclosed in United States copending patent 3,582,454, granted June 1, 1971 of James W. Giffen, also filed Nov. 4, 1968 and assigned to the same assignee as the present application, is employed for trimming the excess glass of said ribbon or continuous sheet of stratified glass from about the bordering or outer edges of each of the otherwise formed glass articles while, substantially simultaneously therewith or just prior to the completion of said trimming, forming said outer edge of each article to complete the respective article by thereby providing the desired peripheral rim or edge thereon.

In the practice of the forming of substantially thin and high strength glass articles as discussed above, the ribbon or sheet of stratified glass from which said articles are formed must, of course, be relatively thin and may, for example, be on the order of about 0.076 inch to 0.084 inch in total thickness. That is to say, the core glass ply of the stratified glass sheet or ribbon may, for example, be between 0.07 to 0.08 inch in thickness with the outer glass plies of such glass sheet or ribbon each having a thickness, for example, on the order of 0.003 inch to 0.004 inch in thickness. As will be readily apparent to those skilled in the art, when a surface of a sheet or ribbon of heat softened glass which is as thin, or has a relatively minute thickness such as that mentioned, contacts a forming surface of a metal glass forming mold, the heat is rapidly conducted from said sheet or ribbon to the metal material of said mold and such glass sheet or ribbon may rapidly become "set-up" and thereby prevent or substantially hinder the desired edge trimming and forming process previously discussed. Accordingly, in order to practice the vacuum forming process as previously discussed, the sheet or ribbon of glass to be so formed is maintained at and supplied to the forming apparatus at a temperature in the vicinity of 1100° C. or higher. The glass must also be at such temperature in order to prevent it from sticking to the forming surface of the mold following the forming of a glass article. As is well known to those skilled in the art, the glass contacting surfaces of the metal materials of which glass molds are fabricated also become rapidly oxidized by contact with glass making materials having relatively high temperatures such at that mentioned, and said glass contacting surfaces thus rapidly become pitted or crazed and the molds must, therefore, be discarded and replaced at relatively frequent intervals. For obvious economic reasons it is very desirous to reduce the frequency at which said intervals occur.

It is, accordingly, one object of the present invention to provide a mold assembly which includes a glass contacting mold surface which is less subject to the oxidation discussed above.

It is another object of the present invention to provide a mold assembly which includes a mold member which is supported by, but is readily separated from a mold support member, for replacement of the mold member at less frequently required intervals, and which also provides for possible renovation of and reuse of the mold member.

It is a third object of the invention to provide a novel mold assembly for use in vacuum forming articles of a thermoplastic material such as glass and which articles are so formed with said material at a somewhat lower temperature than that previously required when using molds of prior types.

Other objects and characteristic features of the invention will become apparent as the description proceeds.

SUMMARY OF THE INVENTION

In accomplishing the above objects of the invention there is provided a mold support member having a cavity for receipt of a mold member therein with the facing walls of such members in intimate but separable contact with each other. The mold support member embodies vacuum passages extending therethrough for application of or supplying vacuum or negative pressure to a sheet or blank of glass disposed about and adjacent to the upper surface of an upper annular wall of the mold support member for drawing said sheet into contact with said annular surface. The mold member includes on its forming surface a glass contacting coating of a ceramic thermal barrier material and embodies a vacuum manifold extending to the exterior of the mold member for connection with a source of vacuum or negative pressure, such manifold also connecting with a plurality of passages embodied in said mold member and which extend through such member and said ceramic coating to foramina or orifices provided in the glass contacting surface of the coating for vacuum forming purposes as hereinafter discussed.

BRIEF DESCRIPTION OF THE DRAWINGS

In the drawings.

Similar reference characters refer to similar parts in each of the figures of the drawings.

PREFERRED EMBODIMENT OF THE INVENTION

Figure 1:
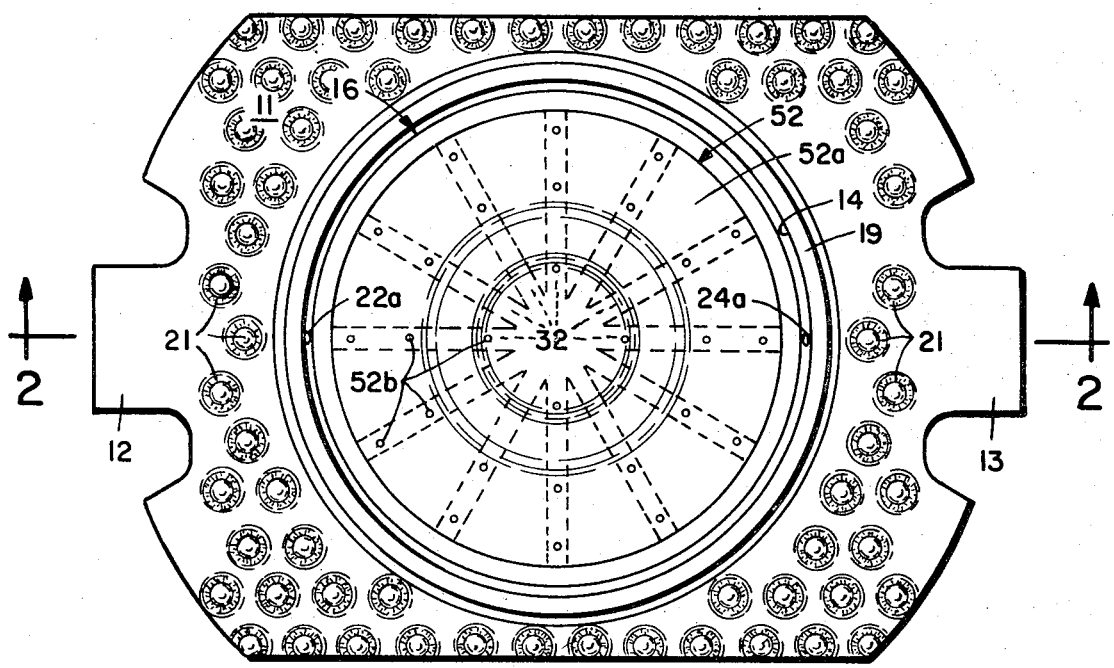
FIG. 1 comprises a top plan view of the mold assembly of the invention.

Referring to the drawings in detail, there is shown a mold support member 11 including oppositely disposed extending lugs 12 and 13 embodying threaded holes 12a and 13a (FIG. 2) by which support member 11 is adapted to be secured by suitably threaded bolts or screws to a vacuum forming machine in a position similar to that illustrated for mold 30 shown in FIG. 3 of the aforecited United States Patent 3,231,356 of James W. Giffen. Mold support member 11 further embodies a cavity 14 having a portion defined by the inner surface 14a of a wall of the support member and conforming in configuration to the outer peripheral surface 16a of a mold member 16 disposed in said cavity with said surfaces 14a and 16a in intimate contact with each other but with mold member 16 readily separable or removable from cavity 14 if not otherwise retained therein in the manner hereinafter discussed.

Figure 2:
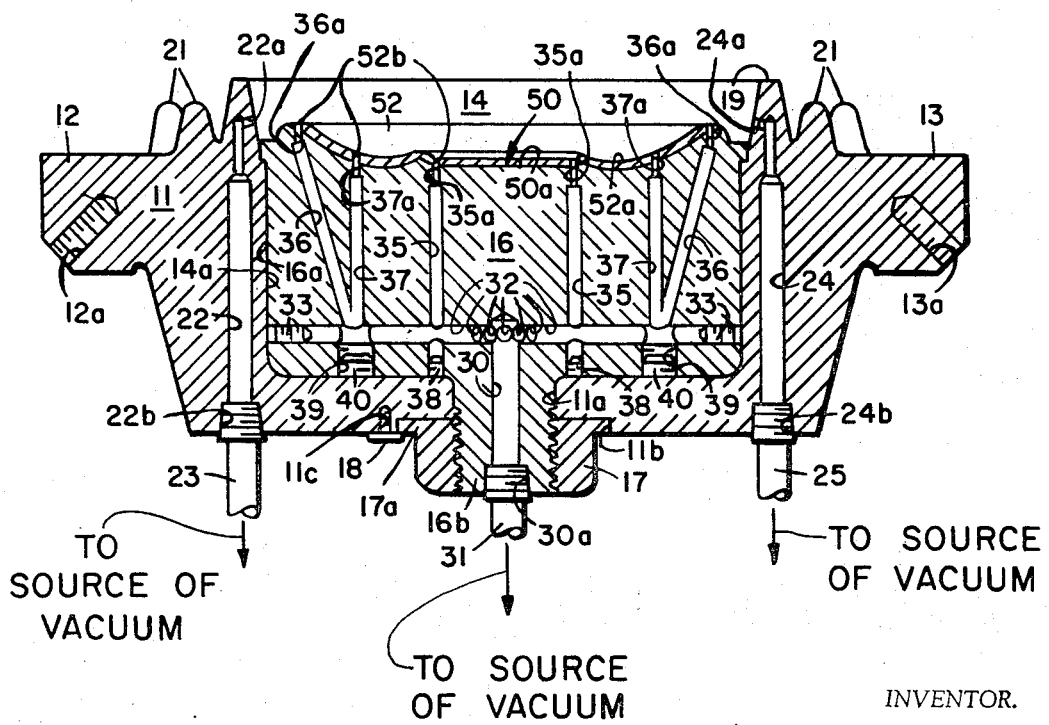
FIG. 2 is a cross sectional view of the mold assembly embodying the invention, such view being taken generally along line 2—2 of FIG. 1.

Mold support member 11 further embodies a passage 11a extending from cavity 14 therein through the lower wall of the support member to the exterior thereof. Passage 11a includes an enlarged exterior portion 11b for the purpose discussed below. Mold member 16 further includes a lower extension or extending threaded portion 16b which protrudes through said passage 11a in mold support member 11 to the exterior of the mold support member. A relatively large nut 17 having a flange portion 17a and internal threads complemental to the threads on said portion 16b of mold member 16 is screwed onto portion 16b as illustrated in FIG. 2 with said flange portion 17a extending into said enlarged exterior portion 11b of passage 11a in mold support 11. A small threaded hole 11c provided in mold support member 11 adjacent said enlarged portion 11b of passage 11a in such member and a cooperatively threaded screw 18 having a head of a relatively large diameter is screwed into said hole 11c as shown in FIG. 2. By the arrangement just described, nut 17 can be screwed onto portion 16b of mold member 16 to secure such mold member tightly in cavity 14 of mold support member 11. Screw 18 is then screwed into hole 11c in member 11 so that the lower surfaces of the head of the screw is drawn tightly against flange portion 17a of nut 17 and also against the lower surface of mold support member 11 to prevent inadvertent turning and/or loosening of nut 17 on portion 16b of mold member 16.

Cavity 14 of mold support member 11 has a depth greater than the height of mold member 16 and the rim of the wall defining the opening leading into cavity 14 of member 11 has a relatively flat annular surface 19 for receipt adjacent to and about such annular surface of a sheet or ribbon of the material to be vacuum formed as hereinafter discussed in more detail in a operational example of the use of the invention. A plurality of upright extending projections or fingers such as 21 and each having a generally conical shape with somewhat rounded or domed heads or upper extremities are provided on the upper surface of flange portion of mold support member 11 surrounding the wall whose rim defines said opening leading into cavity 14 of such mold support member. Such projections are for the support of the excess or overhanging portion of a ribbon or sheet of molten glass extending or spread over or about and adjacent to said annular surface 19 when such ribbon or sheet is so positioned for vacuum forming thereof. This will also be discussed in more detail hereinafter in an operational example of the use of the invention.

Mold support member 11 embodies a first vacuum passage 22 extending through such member and having a first orifice 22a opening into cavity 14 between the aforementioned annular rim 19 and the upper surface of mold member 16. Passage 22 has a threaded second orifice 22b opening to the exterior of the mold support member for connection with a source of vacuum as, for example, by a pipe or conduit 23 having a threaded end which is screwed into the threads in said second orifice 22b of passage 22. A second vacuum passage 24 is also embodied in mold support member 11 and extends therethrough with a first orifice 24a opening into cavity 14 between annular rim 19 and the upper surface of mold member 16. Passage 24 has a threaded second orifice 24b opening to the exterior of the mold support member for connection with a source of vacuum as, for example, by a pipe or conduit 25 having a threaded end which is screwed into the threads in said second orifice 24b of passage 24.

Referring further to FIG. 2, mold member 16 embodies a vacuum manifold 30 having a threaded orifice 30a in portion 16b of the mold member and which opens to the exterior of the mold member for connection with a source of vacuum as, for example, by a pipe or conduit 31 having a threaded end which is screwed into the threads in said orifice 30a of vacuum manifold 30. A plurality of radial vacuum passages such as 32 (FIGS. 1 and 2) are also embodied in mold member 16 and have their innermost ends connecting with each other and with vacuum manifold 30 as best shown in FIG. 2. The passages such as 32 are provided in mold member 16 by drilling through the mold member from the outer peripheral surface 16a of such member and such passages are preferably radially symmetrically arranged about the axial center of the mold member as illustrated by the broken lines in FIG. 1 of the drawings. The outermost ends of the passages such as 32 are threaded and suitable and cooperatively threaded plugs such as 33 (FIG. 2) are screwed into said outermost ends to substantially hermetically seal such ends of the radial passages.

A plurality of upwardly extending vacuum passages such as 35, 36 and 37 are also embodied in mold member 16 and connect with the radial passages such as 32 as illustrated in FIG. 2. The passages such as 35 are provided in mold member 16 by drilling through the mold member from the bottom surface of such member to interconnect with corresponding ones of the passages such as 32, and then extend to locations in the mold member below the surface 50a of a mold cavity 50 provided in such mold member and to be hereinafter discussed. The lower ends of the passages such as 35 are threaded, and suitable and cooperatively threaded plugs such as 38 (FIG. 2) are screwed into the lower or bottom ends of said lower ends of the passages such as 35 to substantially hermetically seal such ends of the passages. Plugs 38 may, for example, be similar to plugs 33 previously mentioned.

The above mentioned passages such as 36 and 37 are similar to passages 35 but, since each respective passage such as 36 slopes and joins with its respectively associated passage such as 37 substantially at a junction with respectively associated radial passage such as 32, in order to drill each associated pair of passages such as 36 and 37 through the mold member, a relatively large diameter circular hole such as 39 is first drilled into the bottom surface of mold member 16. Each hole such as 39 permits a drill bit to drill a vertical passage such as 37 as well as a sloping passage such as 36 while maintaining the circular shape of each hole such as 39 so that it can be provided with threads into which suitable and cooperatively threaded plugs such as 40 can be screwed to provide substantially hermetic sealing of the holes such as 39. The passages such as 35, 36 and 37 are preferably radially symmetrically arranged about the axial center of mold member 16 correspondingly to the arrangement previously mentioned in conjunction with the radial passages such as 32.

Each vacuum passage such as 35, 36, and 37 has an upper end which is, as previously mentioned, located below the surface of mold cavity 50 in mold member 16 and to be hereinafter discussed. At such locations each passage such 35, 36 and 37 joins with a first end of a respectively associated passage such as 35a, 36a, and 37a each of which is of a relatively minute diameter. The second ends of the passages such as 35a, 36a and 37a each extend to the previously mentioned surface 50a of mold cavity 50 and open through such surface through associated orifices provided therein. Because of the relatively minute diameters of the passages such as 35a, 36a and 37a, such passages being for example on the order of 0.015 inch diameter, it is extremely difficult if not entirely impossible to drill such passages through the material of which mold member 16 is formed. Accordingly, such passages are provided in the mold member by an electrical discharge machining process or technique such as is generally now well known in the art.

The previously mentioned foraminous or perforated ceramic coating deposited on or bonded to surface 50a of cavity 50 of mold member 16 to provide a heat barrier is designated 52 and includes an outer thermoplastic materials or glass contacting and forming surface designated 52a. Cavity 50 and its surface 50a in mold member 16 have, for purposes of an example only, the configuration of a mold cavity for the forming of a saucer as will be readily apparent from the diametric cross-section of the cavity 50 and surface 50a shown in FIG. 2 of the drawings. Accordingly, ceramic coating 52 and its glass contacting and forming surface 52a have a cross-sectional configuration conforming to cavity 50 and its surface 50a, respectively, as will be readily apparent from a brief view of FIG. 2 of the drawings. The material or composition used for or from which coating 52 is formed and the process for providing or depositing such coating on said surface 50a of mold cavity 50 or the bonding of such coating to such surface 50a do not, per se, form a part of the present invention but, for purposes of making the disclosure complete, a brief description of a preferred composition and process used in providing the ceramic thermal barrier coating such as 52 will be set forth.

Prior to providing coating 52 on surface 50a of mold cavity 50 in mold member 11, surface 50a is cleaned with trichloroethylene and then a nylon fiber having a diameter corresponding to that of the passages such as 35a, 36a and 37a, that is a diameter on the order of 0.015 inch, is inserted in each of said passages with the upper ends of each respective fiber extending above surface 50a of cavity 50 a distance somewhat greater than the thickness of the coating to be provided on said surface 50a. A slurry comprising 27.0 grams of −325 mesh alumina ($Al_2O_3$), 63.0 grams of silicic acid ($H_2SiO_3$), 21.0 grams of chromic acid ($H_2CrO_4$) having a specific gravity from 1.65 to 1.66, and approximately 37.5 grams of distilled water ($H_2O$) is mixed and a thin coating of such slurry is then sprayed on surface 50a of cavity 50. The amount of water in said slurry may be adjusted, if necessary, to facilitate the spray coating step and/or obtain a coating having a thickness necessary to produce a final coating preferably having a thickness on the order of 0.002 to 0.008 inch. After a coating of the slurry has been sprayed on said surface 50a the mold member 16 is thoroughly air dried and the bottom of such mold member is then placed on a hot plate at a temperature of 100° F. or less. The temperature of the hot plate is then raised to a temperature of 600° F. and left at such temperature until red fumes stop coming off the coating. These fumes must be drawn off through a suitable hood so that they are not released to the working surrounding and, thereby, possibly inhaled by the personnel or workmen.

Following the above described step, mold member 16 is placed in an oven or furnace at a temperature of about 850° F. and for a time period of about 40 minutes. Following the expiration of such time period the temperature in the furnace or oven is increased to about 1250° F. for a time period of about 30 minutes. The oven or furnace is then shut off and allowed to cool to at least 1000° F. Mold member 16 can then be removed from the oven or furnace and placed in a second oven or furnace at a temperature at about 350° F. and for a time period of about 20 minutes. Mold member 16 is then removed from the second oven or furnace and cooled to room temperature. Subsequent to such cooling, mold member 16 and its coating is brushed to remove any loose chrome oxide dust thereon. It is expedient to here point out that during the baking periods, that is, during the periods that mold member 16 is in the oven or furnace at the elevated temperatures, the previously mentioned nylon fibers inserted in the passages such as 35a, 36a and 37a are completely oxidized thereby providing passages such as 52b (FIGS. 1 and 2) which connect with respectively associated ones of said passages such as 35a, 36a and 37a, and which extend through coating 52 and have foramina or orifices opening through forming surface 52a of coating 52 and into the mold cavity now defined by such forming surface 52a.

Subsequent to the cooling of mold member 16, surface 52a of coating 52 is sprayed with a mist of a solution of chromic acid ($H_2CrO_4$) having the same specific gravity as that previously mentioned, such spraying being continued until surface 52a becomes wet. Caution should again be used during such spraying to insure that the mist is not inhaled by the spray operator or other workmen or personnel. Following a period of a minute or so, any excess acid remaining on surface 52a is removed therefrom as by using a paper towel. The mold member 16 is then again subjected to the hot plate and oven or furnace schedules previously described. Such chromic acid spraying and heating schedules are acid impregnation and curing cycles and these cycles are repeated for a number of times such as, for example, from 5 to 8 times. After the final one of said impregnation and curing cycles a mold member such as 16 is ready for insertion into the mold support cavity of a mold support member such as 11 and retention therein by a nut such as 17 as previously discussed.

For purposes of an operational example of the use of the mold assembly herein disclosed, it will be assumed that a plurality of such assemblies are used on a machine similar to that disclosed in the aforecited U.S. Pat. 3,231,356, and that a forming and trimming apparatus and method similar to that disclosed in the aforecited copending application Ser. No. 773,265 is used for trimming excess glass and forming the peripheral edge of an article such as a saucer formed in a cavity defined by a surface 52a of a coating 52 provided in each mold member 16 of the aforesaid plurality of mold assemblies. Under such assumption it will be apparent to those skilled in the art that the portions of a ribbon or sheet of molten glass such as 100 (FIG. 1) of above mentioned U.S. Pat. 3,231,356) which extend between each mold assembly and similar such portions which overhang the rim surface such as 19 of a mold assembly of the present invention may sag downwardly. Accordingly, the previously mentioned upright projections such as 21 of the present invention are provided to support such sagged portions of glass without an intolerable transfer of heat from such glass to the metal material of the mold assemblies.

Assuming now that a section of a sheet or ribbon of molten glass to be formed is disposed adjacent to and about the annular surface 19 of a mold assembly of the present invention, suitable vacuum control valves are actuated to supply vacuum or negative pressure to passages 22 and 24 and then to the unoccupied part of cavity 14 in mold support member 11 which is located above mold member 16. Such vacuum will draw said section of molten glass into hermetic contact with said annular surface 19 as will be readily apparent. Following such drawing of said section of glass into said contact with said annular surface 19, additional suitable vacuum control valves are actuated to supply vacuum or negative pressure to vacuum manifold 30 in mold member 16 and thence through the previously discussed passages in such mold member to the orifices or foramina opening through surface 52a of coating 52 defining a saucer forming cavity as previously mentioned. Such vacuum or negative pressure will draw said section of glass downwardly against and into conformity with the configuration of said surface 52a to form the bottom surface of the desired saucer. The upper surface of the section of glass, because of the relatively high heat of the glass itself, will flow and even itself out to substantially conform relatively smoothly to said surface 52a, and thereby, also to said bottom surface of the desired saucer. The aforementioned trimming and edge forming apparatus is then actuated to trim and form the peripheral edge or rim of the saucer and, following the "setting up" of the glass of the formed saucer, said vacuum or negative pressure is terminated for removal of the saucer from the forming cavity in mold member 16. If found necessary or desirable, positive fluid pressure may be provided through the passages in mold member 16 and in mold support member 11 to aid in removal of the formed saucer from mold member 16 and the excess glass which was trimmed from about the peripheral edge or rim of the formed saucer.

It is pointed out that the pattern or location of the orifices or foramina provided in the upper surface such as 52a of a coating such as 52 and the number of such foramina or orifices can vary considerably from that illustrated in FIG. 1 of the drawings and that such a pattern or location will, of course, also vary with the type shape or configuration of each article vacuum formed by the use of a mold assembly such as that disclosed herein.

It is believed that it will be expedient to again point out the previously mentioned advantages of a mold assembly such as that disclosed herein as well as several additional advantages which have not been previously mentioned or have not been discussed to a sufficient extent for a complete understanding thereof. Such advantages are as follows:

(1) By using a ceramic thermal barrier glass contacting coating such as that disclosed, oxidation and resultant crazing or pitting of the surface of the mold metal material previously contacted by the molten glass is substantially reduced or eliminated thereby requiring replacement of molds at less frequent intervals.

(2) The ceramic thermal barrier glass contacting coating reduces or inhibits rapid transfer or conduction of the heat from the glass sheet or ribbon being formed, thereby reducing a so-called chill effect on the lower surface of an article vacuum formed from such sheet or ribbon.

(3) The mold assembly employing a separable mold member as disclosed herein permits removal of the mold member alone and replacement thereof by a new or renovated mold member. The removed or replaced mold member can then be renovated by recoating thereof and be subsequently used as a replacement mold member.

(4) The substantial wear on the mold metal annular surfaces which support the glass during edge forming and trimming operations require such surfaces to be hardened or provided with a relatively hard metal layer which is welded to such surfaces. With the use of the one piece metal molds, such welding was an operation which had to be performed manually and was, therefore, a relatively expensive operation. However, by the use of separable mold members such as disclosed herein, the required welding of said support surfaces can be readily performed substantially automatically on a suitable welding machine thereby reducing the costs of the described welding operations to a minimum.

Although there is herein shown and described only one form of apparatus embodying the invention, it will be understood that various changes and modifications may be made therein within the purview of the appended claims without departing from the spirit and scope thereof.

I claim:

1. A mold assembly for vacuum forming an article of a molten thermoplastic material, such assembly comprising:
    (A) a mold member embodying,
        (I) a forming cavity including an inner surface having a configuration corresponding to that desired for said article to be vacuum formed and a foraminous coating of a ceramic thermal barrier material on said surface and having a normally exposed surface corresponding to said configuration for said article, and
        (II) a plurality of vacuum passages each having a first end connecting through one of the foramina of said foraminous coating to said exposed surface thereof and a second end connected to a vacuum manifold extending through a selected portion of said mold member for connection to a source of vacuum;
    (B) a mold support member adapted to be mounted on a machine for said forming of said article and embodying,
        (I) a cavity defined by a wall including an annular rim surface for receipt adjacent to and about such surface of a sheet of said material to be vacuum formed and an inner surface in substantially intimate contact with the surface of the outer wall of said mold member with said selected portion of the mold member extending through said support member for connection of said manifold to said source of vacuum, and
        (II) a vacuum passage having a first end opening through said inner surface of said wall of said support member at a location between said annular rim surface and said surface of said outer wall of said mold member and a second end extending through a selected portion of said support member for connection to a source of vacuum.

2. A mold assembly in accordance with claim 1 and in which said foramina of said foraminous coating are radially symmetrically disposed about and between the axial center of said coating and the outer peripheral limits of such coating.

3. A mold assembly for vacuum forming an article of a molten thermoplastic material, such assembly comprising a mold support member adapted to be mounted on a machine for said forming of said article and a mold member, said mold support member embodying;
    (A) a cavity defined by the inner surface of a wall conforming in configuration to the outer peripheral surface of said mold member for receipt therein of the mold member with said surfaces in intimate but separable contact with each other said cavity having a depth greater than the height of said mold member and the rim of said wall defining the opening leading into said cavity having a relatively flat annular surface for receipt adjacent to and about such annular surface of a sheet of said material to be vacuum formed, and
    (B) a vacuum passage extending through said mold support member and having a first orifice opening into said cavity and a second orifice opening to the exterior of said mold support member for connection with a source of vacuum; and said mold member disposed in said cavity of said mold support member and embodying;
        (I) a forming cavity having a surface facing said opening leading into said cavity of said mold support member with said first orifice of said vacuum passage located between said rim of said wall of the mold support member and the outer peripheral limits of said forming cavity of said mold member, and said facing surface of said forming cavity having a configuration corresponding to that desired for said article to be vacuum formed and including on such facing surface a thermal barrier coating of a ceramic material having a normally exposed exterior surface corresponding to said configuration for said article; and (II) a vacuum manifold having a first end extending to the exterior of said mold support member for connection with a source of vacuum, and a second end connecting with first ends of a plurality of vacuum passages extending through said mold member and having second ends connecting with relatively minute orifices opening through said coating to said exterior surface thereof.

4. A mold assembly in accordance with claim 3 and in which said orifices opening through said ceramic coating are generally disposed radially symmetrically about and between the axial center of said coating and the outer peripheral limits of such coating.

References Cited

UNITED STATES PATENTS

| | | | |
|---|---|---|---|
| 3,290,418 | 12/1966 | Best | 425—388 |
| 3,453,094 | 7/1969 | Keefer | 65—374 |

ROBERT L. LINDSAY, JR., Primary Examiner

U.S. Cl. X.R.

65—374; 249—114; 425—388